United States Patent [19]

Nomura

[11] 4,252,411
[45] Feb. 24, 1981

[54] LENS BARREL

[75] Inventor: Katsuhiko Nomura, Kawagoe, Japan

[73] Assignee: Asahi Kogaku Kogyo Kabushiki Kaisha, Tokyo, Japan

[21] Appl. No.: 32,801

[22] Filed: Apr. 24, 1979

[30] Foreign Application Priority Data

Apr. 24, 1978 [JP] Japan ............... 53/54738[U]

[51] Int. Cl.³ ............................................. G02B 7/02
[52] U.S. Cl. ................................................. 350/255
[58] Field of Search ............... 350/252, 255; 354/286

[56] References Cited

U.S. PATENT DOCUMENTS

| | | | |
|---|---|---|---|
| 2,536,500 | 1/1951 | Hinden | 350/255 X |
| 3,888,568 | 6/1975 | Norris et al. | 350/252 |
| 3,942,876 | 3/1976 | Betensky | 350/255 X |

*Primary Examiner*—F. L. Evans
*Attorney, Agent, or Firm*—Sughrue, Rothwell, Mion, Zinn and Macpeak

[57] ABSTRACT

A lens barrel comprising a lens frame formed with a thread for distance adjustment and a lens mount cylinder formed with a corresponding thread in meshing engagement with the thread formed in the lens frame. A distance ring engages the lens frame and is arranged so that the mutual position between the distance ring and the lens frame in the radial direction can be set. Stops for limiting the accurate rotational angle between the distance ring and the lens mount cylinder in the radial direction are formed in the distance ring and are engaged by projections on the lens mount cylinder.

6 Claims, 2 Drawing Figures

LENS BARREL

BACKGROUND OF THE INVENTION

This invention relates to a simplification of assembling and adjusting of a lens barrel.

Within the prior art a variety of different lens constructions of varying complexity are known. One of the aspects crucial to efficient manufacture of such lens is the ability to assemble them with a minimum of special tooling, yet allow for accurate calibration and ease in actual operation. Since the camera industry is one noted by cost competition, improvements that tend to lower manufacturing costs while not degrading quality are significant. Hence, while the precision of optical elements remains a prime criteria, the mechanical enterface, i.e. the lens housing components can be simplified yet not degrade the overall quality of the lens.

Moreover, the ease of assembly is a prime consideration since, coupled with adjustment, these operations done entirely by hand. The increases in labor costs and the need to train skilled personal, significantly add to the cost of such lens. Hence, simplification of the lens assembly that reduces assembly and calibration time is a prime consideration.

SUMMARY OF THE INVENTION

Accordingly, it is an object of this invention to eliminate the disadvantages and provide a lens barrel that is inexpensive to manufacture and simple in assembling and adjusting.

Briefly, these and other objects are achieved by providing a lens barrel comprising a lens frame formed with a thread for distance adjustment. A lens mount cylinder is formed with a corresponding thread in meshing engagement with the thread formed in the lens frame. A distance ring engages the lens frame and is arranged so that the mutual position between the distance ring and the lens frame in the radial direction can be set. Stops or notches for defining rotational angle between the distance ring and the lens mount cylinder in the radial direction are formed in the distance ring and the lens mount cylinder, respectively.

BRIEF DESCRIPTION OF DRAWINGS

This invention will now be described with reference to the drawings.

DETAILED DESCRIPTION OF THE INVENTION

Figure 1:
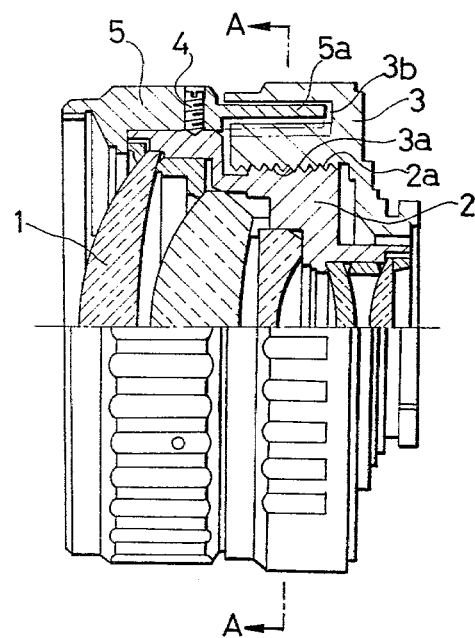
FIG. 1 is a side view of an embodiment of this invention, partially cut away.

Referring to now to the drawings, and in particular FIG. 1 reference numeral 1 designates a lens. Reference numeral 2 designates a lens frame for supporting the lens 1. The lens frame 2 is formed with a helicoid thread 2a distance adjustment on its outer periphery in meshing engagement with a helicoid thread 3a formed on an inner periphery of a lens mount cylinder 3. Reference numeral 5 designates a distance ring. The distance ring 5 fittingly engages the forward portion of the lens frame 2 and it is provided with a setscrew 4 by which the mutual position between the distance ring 5 and the lens frame 2 in the radial direction can be appropriately set.

Figure 2:
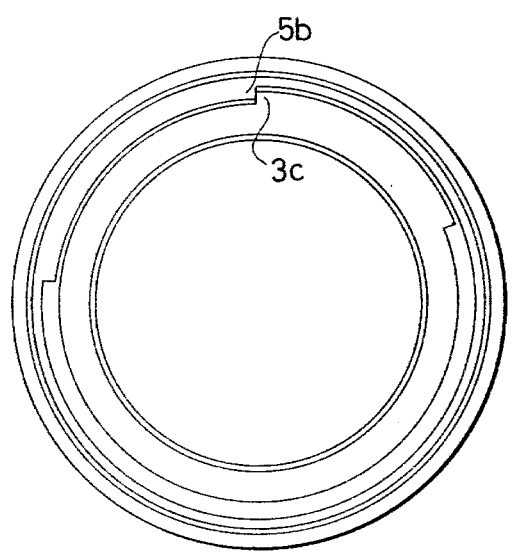
FIG. 2 is a sectional view taken on line A—A of FIG. 1.

Also, a back end portion 5a of the distance ring 5, loosely fitted, engages an annular groove 3b formed in the lens mount cylinder 3. Further, as shown in FIG. 2, the back end portion 5a and an annular groove 3b are formed with a convex portion 3c and a raised arcuate portion 5b, respectively, which contact each other to prevent further rotation therebetween. Thus, the rotational angle between the lens mount cylinder 3 and the distance ring 5 is defined by the contact of the portions 5b and 3c.

In assembling the members described above, first the helicoid thread 3a of the lens mount cylinder 3 is engaged with the helicoid thread 2a of the lens frame 2 and then, the focus is adjusted to properly focus the lens on an object located in the infinite distance. Thereafter, the distance ring 5 is fittingly engaged to the forward portion of the lens frame 2 and the setscrew 4 is screwed in the position where the raised arcuate portion 5b of the distance ring 5 comes in contact with the convex portion 3c of the lens mount cylinder 3.

The annular groove 3b of the lens mount cylinder 3 may be made by an insert moulding of plastic and the distance ring 5 may be also made of a plastic. As a result, the manufacturing cost of the lens barrel can be reduced and the assembling and adjustment can be simplified.

What is claimed is:

1. A lens barrel comprising:
    a lens frame for holding a lens assembly formed with a thread for distance adjustment,
    A lens mount cylinder formed with a thread in meshing engagement with said thread formed in said lens frame,
    a distance ring positioned to contact said lens frame, locking means associated with said distance ring and said lens frame and arranged so that the mutual position between said distance ring and said lens frame in the radial direction can be set, and
    means for defining limits of the rotational angle between said distance ring and said lens mount cylinder in the radial direction and formed in said distance ring and said lens mount cylinder, respectively.

2. The lens barrel of claim 1 wherein both said distance ring and said lens mount cylinder are formed from a moulded plastic part.

3. The lens barrel of claim 1 wherein said distance ring is formed from a moulded plastic part.

4. The lens barrel of claim 1 wherein said lens mount cylinder is formed from a moulded plastic part.

5. The lens barrel of claim 1 wherein said locking means comprise a set screw coupling said lens frame and said distance ring, whereby the mutual position between said lens frame and said distance ring is set when said lens assembly is focused at infinity.

6. The lens barrel of claims 1, 2, 3, 4, or 5 wherein said means defining limits of the rotational angle comprises a raised arcuate portion formed on an annular groove of said distance ring and a raised surface having end portions formed on said lens mount cylinder whereby one end portion of said raised surface engages said arcuate portion when said distance ring is focussed at infinity and the other raised surface engages said arcuate portion at an extreme inner focusing limit of said lens.

* * * * *